United States Patent [19]

Harwood

[11] Patent Number: 4,562,460
[45] Date of Patent: Dec. 31, 1985

[54] MANUAL HUE CONTROL AS FOR A DIGITAL TV

[75] Inventor: Leopold A. Harwood, Bridgewater, N.J.

[73] Assignee: RCA Corporation, Princeton, N.J.

[21] Appl. No.: 487,082

[22] Filed: Apr. 21, 1983

[51] Int. Cl.[4] .............................................. H04N 9/64
[52] U.S. Cl. ..................................................... 358/28
[58] Field of Search ......................................... 358/28

[56] References Cited

U.S. PATENT DOCUMENTS

| | | |
|---|---|---|
| 3,294,900 | 12/1966 | Kool . |
| 3,536,827 | 10/1970 | Bell . |
| 3,873,760 | 3/1975 | Worden ................................ 358/21 |
| 3,996,608 | 12/1976 | Harwood ............................. 358/28 |
| 4,001,879 | 1/1977 | Nagaoka et al. ....................... 358/28 |
| 4,084,178 | 4/1978 | Srivastava et al. .................... 358/28 |
| 4,091,411 | 5/1978 | Sanada et al. ........................ 358/28 |
| 4,197,556 | 4/1980 | Isonu et al. ........................... 358/28 |
| 4,412,181 | 10/1983 | Marguinaud et al. ................. 329/50 |

FOREIGN PATENT DOCUMENTS 0071506  7/1982  European Pat. Off. .

OTHER PUBLICATIONS

T. Fischer, "Digital VLSI Breeds Next-Generation-TV Receivers" Electronics, Aug. 11, 1981—pp. 97–103.
L. A. Harwood et al., "Chroma Circuit Design for the CTC-49" RCA Engineer, vol. 15, No. 5, Feb./Mar. 1971, pp. 15-19.

Primary Examiner—Richard Murray
Attorney, Agent, or Firm—E. M. Whitacre; P. J. Rasmussen; E. P. Herrmann

[57] ABSTRACT

A TV receiver arranged to process video signals in PCM binary format includes a manual hue control circuit which operates on the PCM color mixture signals to effectively rotate the vector sum of the color mixture signals while maintaining the magnitude of the sum substantially constant. The magnitude of the received vector sum is calculated and the angle between the sum and one of the color mixture signal components is determined. Circuitry under user control increments or decrements the angle to rotate the vector sum. Corrected color mixture signals are then generated by multiplying the magnitude of the calculated vector sum by the sine and cosine of the incremented angle.

11 Claims, 6 Drawing Figures

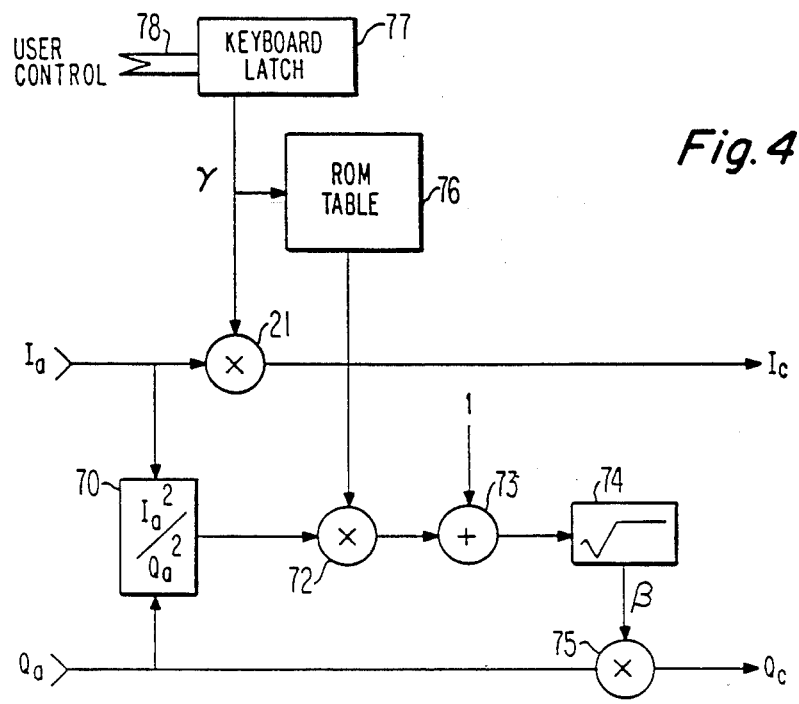
Fig.4(a)
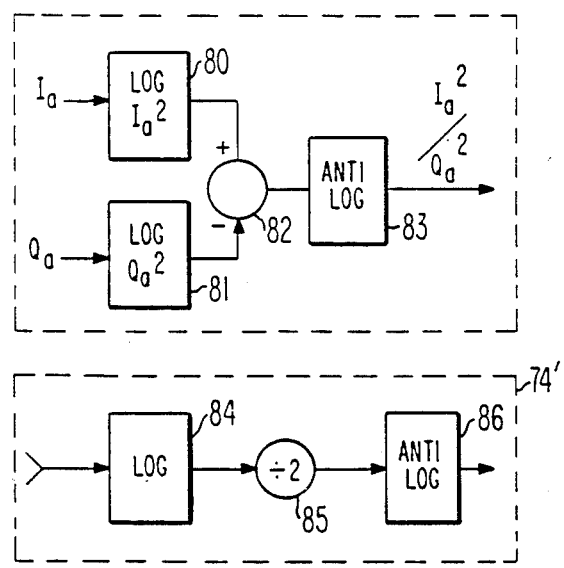
Fig.4(b)
Fig.4(c)

MANUAL HUE CONTROL AS FOR A DIGITAL TV

BACKGROUND OF THE INVENTION

This invention relates to circuitry for adjusting the hue of a reproduced TV image and more particularly to circuitry in a digital TV for simulating a phase change in the relative sampling points of the color mixture signals to effect such change.

Hue control in conventional (analog) TV receivers, whether automatic or manual, has traditionally been effected by phase shifting the reference signal to the color mixture signal demodulator circuits. Similarly, in the more recent digital TV receivers, hue control is accomplished by altering the phase of the sampling points, relative to burst, at which analog-to-digital conversions are made. See, for example, the article "Digital VLSI Breeds Next-Generation TV Receivers", Electronics, Aug. 11, 1981, pp. 97-103. Note that altering the sampling phase permits sampling the composite signal on any color axis desired.

Phase shifting circuits generally include circuit elements which have selectably variable parameters which are subject to drift and are not stable over extended periods of time. Thus, frequent adjustments of hue may be necessary. Digital circuits, on the other hand, are inherently stable with respect to their response characteristics. As a result, if hue correction is performed digitally, i.e. numerically, on the sampled signal, the corrections will not be subject to variations over time due to device aging, etc.

SUMMARY OF THE INVENTION

The present invention performs hue control directly on the demodulated color mixture signals. In a digital TV receiver, the composite video signal is encoded into a pulse code modulated (PCM) signal which is thereafter separated into its luminance and chrominance components. The chrominance component is processed and demodulated into its color mixture signals, for example, the (R-Y) and (B-Y) color mixture signals or the I and Q color mixture signals. The actual color being transmitted is represented by the vector C, which is the vector sum of the current, e.g. I and Q samples and equal to the square root of $(I^2+Q^2)$. The relative angle of the vector C with respect to the Q axis is the arctangent of I/Q or the arc sine of I/C. Once the angle is determined, the hue can be adjusted by manually incrementing/decrementing the angle and generating new color mixture signals I' and Q', by forming the products of the vector C with the sine and cosine of the incremented/decremented angle.

The apparatus for performing the above described hue control includes a first read only memory (ROM) addressed by the current I and Q samples programmed for producing the log of the square root of $(I^2+Q^2)$, i.e. the log of the vector, and a second ROM addressed by the current I and Q samples programmed for producing the arctangent of I/Q, i.e. the phase angle $\phi$. The output from the second ROM is applied to the input of an increment/decrement circuit which increases or decreases the binary number representative of the phase angle $\phi$ responsive to a series of pulses applied under user control. The incremented/decremented phase angle $\phi+\Delta\phi$ is applied as an address signal to a third ROM which is programmed to produce at respective output terminals the log of the sine of $\phi+\Delta\phi$ and the log of the cosine of $\phi+\Delta\phi$. The log sin $(\phi+\Delta\phi)$ and log cos $(\phi+\Delta\phi)$ are applied to first input connections of first and second adder circuits each having a second input connection coupled to the output of the first ROM. The first and second adder circuits produce the sums of log C+log sin $(\phi+\Delta\phi)$ and log C+log cos $(\phi+\Delta\phi)$, which sums are multiplexed as addresses to a fourth ROM which is programmed to successively produce the antilogs of the sums. The output of the fourth ROM is demultiplexed to generate corrected I and Q signals.

BRIEF DESCRIPTION OF THE DRAWINGS

FIGS. 2, 3 and 4 are block diagrams of circuitry for numerically performing hue control embodying the present invention.

DETAILED DESCRIPTION OF THE INVENTION

Figure 1:
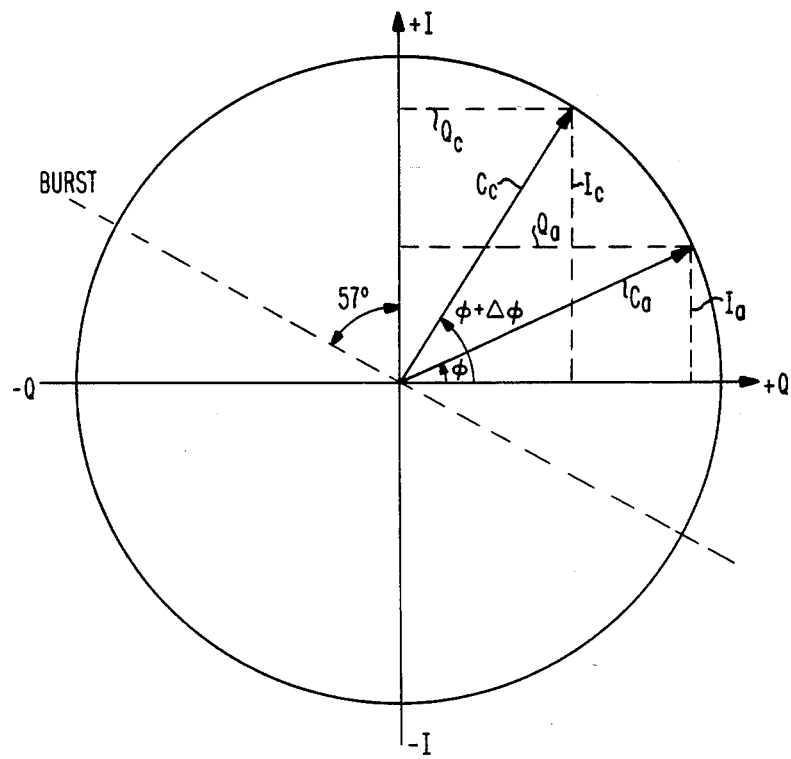
FIG. 1 is a vector diagram showing the relationship of the I and Q color mixture signals associated with a video chrominance signal relative to the resultant chrominance vector C.

Referring to FIG. 1, the I and Q color mixture signals are seen to be in quadrature relationship. In a digital TV receiver, if the analog signal is sampled on the I and Q axis, and the subsequent processing of the PCM signals is linear, the vector resulting from the vector sum of the I and Q signals will be representative of the actual chrominance signal transmitted. In FIG. 1, the vector Ca is the vector sum representative of the actual demodulated I and Q samples Ia and Qa. Consider, however, that due to sampling at the improper chroma phase, or the particular response of the eye of a particular viewer, the resultant chrominance vector should be represented by the vector Cc. Then the system should provide a means to rotate the actual vector Ca at angle $\phi$ to the position of a corrected vector Cc at angle $\phi+\Delta\phi$. At this point, it is to be remembered that the I and Q signals are the signals actually processed by the receiver, thus, it is the components (I, Q) of the vector C that are to be corrected and not the vector C per se. It is also pointed out that the present invention and analysis pertains equally to a receiver which processes (R-Y) and (B-Y) color mixture signals or any other quadrature related color mixture signals. In the instant case the I and Q color mixture signals have been chosen for illustration.

In FIG. 1, the length of the vector C represents color saturation. Any angular changes of the vector to effect a hue change desirably should not alter the color saturation. Thus, the tip of the vector, as it is rotated, should trace out a circle.

In the receiver, the known quantities are the Ia and Qa samples. Using simple trigonometric relationships, the angle $\phi$ can be determined from the arctangent of I/Q and the vector sum Ca from the theorom of Pythagarous, i.e. $Ca^2=Ia^2+Qa^2$. Since the magnitude of the corrected vector Cc is to equal the magnitude of the actual vector Ca, the vector components Ic and Qc of any vector Cc at any angle $\phi+\Delta\phi$ may be computed from the equations:

$$Ic = Ca \sin(\phi+\Delta\phi) \qquad (1)$$

$$Qc = Ca \cos(\phi+\Delta\phi) \qquad (2)$$

The Ic and Qc signals may subsequently be processed in the conventional manner to generate R, G, B signals for display on the TV receiver. In the embodiment of FIG.

2 described below, the apparatus includes circuitry to perform these functions. Included in the apparatus is a circuit by which the user can increment or decrement the angle $\phi$ while he is viewing the display, until proper hue is attained.

It will be recognized that an alternate method for determining the magnitude of the vector Ca is via the following relations:

$$Ca = Qa/\cos\phi = Ia/\sin\phi. \quad (3)$$

Substituting equation (3) into equations (1) and (2) yields the equations for Ic and Qc given by $$Ic = Ia \sin(\phi + \Delta\phi)/\sin\phi \quad (4)$$

$$Qc = Qa \cos(\phi + \Delta\phi)/\cos\phi. \quad (5)$$

Determining Ca by equation (3) obviates the necessity of determining the square root of the sum of the squares of Ia and Qa. Circuitry for generating Ic and Qc from equations (4) and (5) will be described hereinafter with reference to FIG. 3.

The same result can also be obtained in a slightly different manner by operating on the I and Q signals with single variables. We know that $Cc^2$ must equal $Ca^2$ to maintain color saturation constant and:

$$Ca^2 = Ia^2 + Qa^2. \quad (6)$$

A corrected component Ic can be generated by multiplying Ia by a user controlled variable $\gamma$, i.e.

$$Ic = \gamma Ia. \quad (7)$$

In order to maintain the magnitude of Cc equal to the magnitude of Ca, the Q component must be multiplied by a dependent variable, e.g. $\beta$, that is:

$$Qc = \beta Qa \quad (8)$$

then $$Cc^2 = Ca^2 = (\gamma Ia)^2 + (\beta Qa)^2. \quad (9)$$

Solving for $\beta$ $$\beta = \sqrt{1 + (1 - \gamma^2)Ia^2/Qa^2}. \quad (10)$$

By simple trigonometric manipulation, it can be shown that $\gamma Ia$ is equivalent to $Ca \sin(\phi + \Delta\phi)$ and $\beta$ is equivalent to $Ca \cos(\phi + \Delta\phi)$. Apparatus for performing hue control in this manner will be described with reference to FIG. 4.

Figure 2:
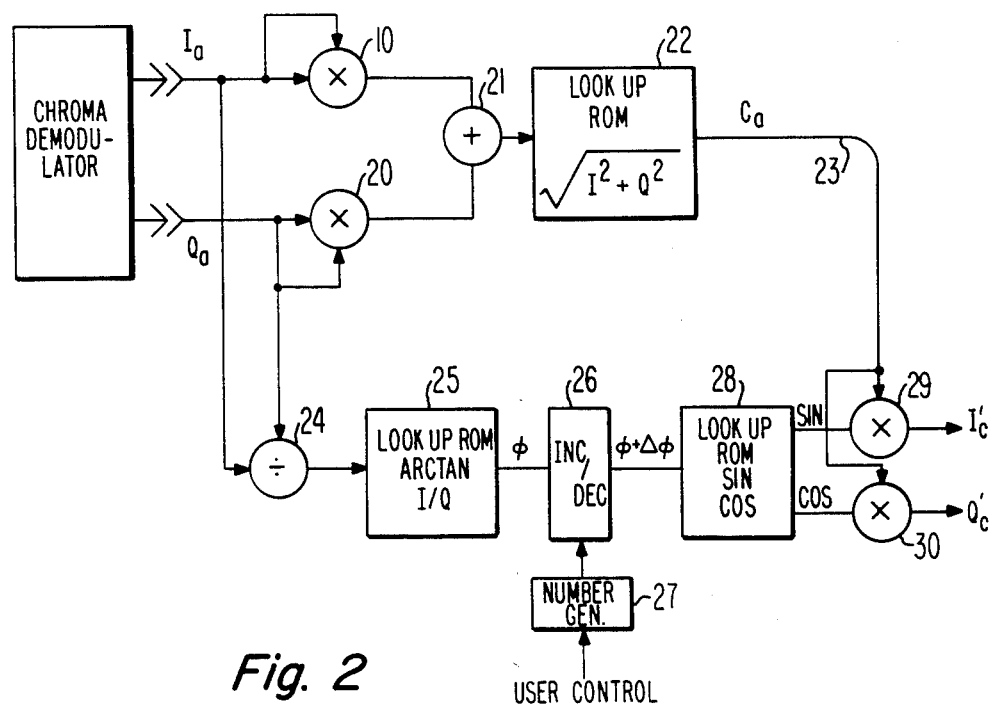
Figure 3:
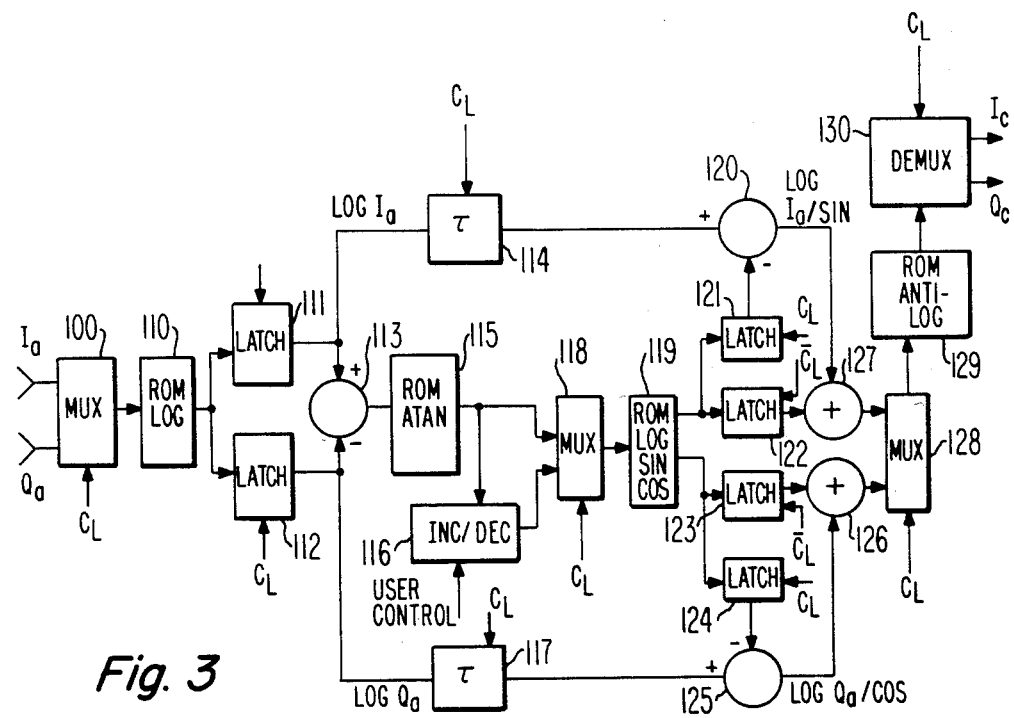

The circuitry of FIGS. 2, 3 or 4 will be located in the color signal processing channel of a digital TV receiver. The circuits will occur after Y/C separation circuits, but before the RGB matrix. Preferrably, the circuits will be placed after the color mixture signal demodulator so that the quadrature components (I,Q) or (R-Y), (B-Y) are available and are in PCM format. The interconnections between elements are, in general, n-bit busses for interconnecting n-bit PCM codes in parallel. The respective circuit elements may be traditional binary circuits known in the art of binary signal processing.

Referring now to FIG. 2, circuitry is shown for generating altered or corrected color mixture signals by the method of determining the current vector sum Ca of the color mixture signals Ia and Qa, and one of the angles between either I or Q axes and the vector sum Ca. The color mixture signals Ia and Qa are respectively applied to the multiplier circuits 10 and 20 in which they are multiplied by themselves to generate $Ia^2$ and $Qa^2$. The output terminals of multipliers 10 and 20 are connected to the input connections of ADDER circuit 21 which produces the sum of $Ia^2 + Qa^2$ at its output. The sum of squares is applied to circuitry 22 for determining the square root thereof, which equals the magnitude of Ca. Circuitry 22 may be a ROM arranged to be addressed by the value representing the sum $Ia^2 + Qa^2$ and programmed to output the value equal to the square root of the particular address code. Alternatively, circuitry 22 may be realized with elements similar to those to be described with reference to FIG. 4(c).

The angle between Ca and Qa is found from the arctangent of Ia/Qa. To this end, signals Ia and Qa are respectively applied as dividend and divisor to DIVIDER circuit 24. The output signal samples from DIVIDER 24 are applied as address codes to ROM 25. ROM 25 is programmed to produce at its output, the values of the arctangent of Ia/Q a (i.e. the angle $\phi$ between Ca and Qa) for each respective address code applied thereto. The PCM signal corresponding to the angles $\phi$ from ROM 25 is applied to incrementing-/decrementing circuit 26. Circuit 26 may be an ADDER circuit, which, subject to user control, adds positive or negative values $\Delta\phi$ from number generator 27 to the value of $\phi$. Number generator 27 may be a user operated keyboard with latches for retaining the keyed in value, or it may be, e.g. an up/down counter responsive to a clock signal and user activation to produce a binary count ($\Delta\phi$) proportional to the duration that the user energizes it.

The new angle $\phi + \Delta\phi$ from circuit 26 is applied as address codes to a further ROM 28 which produces signals corresponding to the sine and cosine values of the respective address codes. The $\sin(\phi + \Delta\phi)$ values and the $\cos(\phi + \Delta\phi)$ values from ROM 28 are applied respectively to the MULTIPLIER circuits 29 and 30. The vector sum Ca from ROM 22 is also applied to the MULTIPLIER circuits to generate the products $Ca \cos(\phi + \Delta\phi)$ equal to the corrected color mixture signal Qc, and $Ca \sin(\phi + \Delta\phi)$ equal to the corrected color mixture signal Ic.

Referring next to FIG. 3, use is made of logarithms to facilitate multiplication and division by simpler ADD-/SUBTRACT circuits. Since subtraction is normally performed by an ADDER adding a complemented AUGEND to an ADDEND, the ADD/SUBTRACT circuits will hereinafter be referred to as ADDERS. The log look up tables (ROM's) are multiplexed between signals or functions to further reduce circuit complexity.

In FIG. 3, the Ia and Qa color mixture samples are applied to a multiplexor 100 which alternately applies the Ia and Qa signal samples as address codes to the ROM 110. ROM 110 is programmed to produce the logarithm of the address code, i.e. the log of the samples applied. The alternate Ia and Qa logarithms produced by ROM 110 are respectively demultiplexed by the latches 111 and 112. The latched Ia and Qa logarithms are applied to the ADDER circuit 113 which provides the difference log Ia - log Qa at its output terminal. This difference, equivalent to the log Ia/Qa, is applied as address codes to ROM 115, which is programmed to produce the arctangent of Ia/Qa the log Ia/Qa address representing these ratios. The arctangent is equal to the angle between the vectors Ca and Qa.

The angle $\phi$ from ROM 115 is applied to incrementor/decrementor 116 which may be similar to element 26 described with reference to FIG. 2. Incrementor/decrementor 116 increases or decreases the angle $\phi$ for rotating the vector C. The angle $\phi$ from ROM 115 and the angle $\phi \pm \Delta\phi$ from circuit element 116 are applied to multiplexor 118 which alternately applies the signals corresponding to these angles to ROM 119 as address codes. ROM 119 is programmed to produce the log sine and log cosine of the address codes applied thereto.

The output signals from ROM 119 are applied to latches 121, 122, 123 and 124 which demultiplex the f($\phi$) signals from the f($\phi+\Delta\phi$) signals. The log sin ($\phi$) and log cos ($\phi$) values are latched in latches 121 and 124, respectively, and the log sin ($\phi \pm \Delta\phi$) and log cos ($\phi \pm \Delta\phi$) values are latched in latches 122 and 123, respectively. The log sin ($\phi$) from latch 121 is applied to one input port of subtractive ADDER 120 and the log Ia from latch 111 delayed by element 114 is applied to a second input port of ADDER 120 which produces signals corresponding to the log Ia/sin $\phi$. Similarly, the log cos ($\phi$) and log Qa are applied to ADDER 125 to generate signals corresponding to the log Qa/cos $\phi$. Note, delay elements 114 and 117 are interposed in the log Ia and log Qa signal paths to compensate for the processing time required by circuit elements 115, 119, etc. As such, the entire FIG. 3 circuit operates in pipeline fashion. The details of pipeline processing are well known to those practicing the digital signal processing art and will not be elaborated further.

The signal corresponding to log sin ($\phi \pm \Delta\phi$) from latch 122 and a signal corresponding to the log Ia/sin $\phi$ from ADDER 120 are applied to ADDER 127 which produces signals representing log (Ia sin ($\phi \pm \Delta\phi$)/sin $\phi$) = log (Ca sin ($\phi \pm \Delta\phi$)) = log Ic. Similarly, the log cos ($\phi \pm \Delta\phi$) from latch 123 and the log Qa/cos $\phi$ from ADDER 125 are applied to ADDER 126 which produces signals representing the log (Ca cos ($\phi \pm \Delta\phi$)) equal to log Qc. The signals from ADDERS 126 and 127 are applied to multiplexor 128 which alternately applies these signals as address codes to ROM 129. ROM 129 is programmed to output the antilog of the particular address codes applied thereto. The sequentially generated antilogs are applied to demultiplexor 130 which separates the sequential signals into an Ic signal and a Qc signal.

If the Ia and Qa signals are 8-bit PCM samples, the circuit of FIG. 3 requires five 8-bit ADDER circuits and a total of 1K bytes of ROM. The FIG. 2 circuit on the other hand requires four 8-bit by 8-bit multipliers, an 8-bit by 8-bit divider, a 16-bit by 16-bit adder and a total of about 65K bytes of ROM.

Referring next to FIG. 4, there is shown circuitry for arbitrarily altering the Ia signal by a user generated factor $\gamma$ and altering the Qa signal by a computed factor $\beta$. The illustrated circuit is shown schematically with functional blocks such as multipliers and dividers, but it should be recognized that these blocks may be realized with, for example, log tables and ADDERS, as in the FIG. 3 circuit.

In FIG. 4(a), the user generates a quantity $\gamma$ in circuit 77. Circuit 77 may be a keyboard and latch configuration which produces a binary output. Alternatively, circuit 77 may be a presettable up/down counter preset to the value 1. A clock under user control may be coupled to the counter to increment/decrement the preset value to generate a range of factors $\gamma$.

The factor $\gamma$ is applied to multiplier 21 to which the Ia color mixture signal is coupled. The output of multiplier circuit 21 is the corrected color mixture signal Ic.

The factor $\gamma$ is also applied to ROM 76 as address codes. ROM 76 is programmed to produce signals equal to $(1-\gamma^2)$ for the respective address codes. The signals from ROM 76 are applied to a multiplier circuit 72. The factor $Ia^2/Qa^2$ from circuit element 70 is applied to a second input of multiplier 72 which generates the product $(1-\gamma^2)Ia^2/Qa^2$.

This value is applied to an ADDER 73 which adds one to the product yielding the quantity $(1-\gamma^2)Ia^2/Qa^2+1$ which is applied to circuit 74 which in turn produces the factor $\beta$, i.e. the square root of the quantity $(1-\gamma^2)Ia^2/Qa^2+1$.

The factor $\beta$ is applied to multiplier 75 which has a second input connection to which the color mixture signal Qa is applied. Multiplier 75 produces the corrected color mixture signal Qc, according to equations (8) and (10).

FIG. 4b illustrates in detail how circuit element 70 may be realized. In FIG. 4b, the color mixture signal Ia is applied as an address code to a ROM 80 which is programmed to output the log of the square of the applied address. The color mixture signal Qa is applied as address codes to a ROM 81 which is programmed to output the log of the square of its particular address codes. The outputs of ROM's 80 and 81 are applied to an ADDER circuit 82, which generates the difference of the logs, i.e. $\log Ia^2 - \log Qa^2 = \log Ia^2/Qa^2$. This quantity is applied as address codes to ROM 83 which is programmed to produce at its output the antilog of its address codes, i.e. $Ia^2/Qa^2$.

FIG. 4c illustrates circuitry by which the square root circuit 74 may be realized. In this circuit, the value for which the square root is to be determined is applied as address codes to a ROM 84 which is programmed to generate the logs of the applied addresses. The output of ROM 84 is applied to divider circuit 85 (right shift 1 bit position) which halves the logs. The output of divider 85 is applied as address codes to a ROM 86 programmed to produce the antilogs of the applied addresses.

What is claimed is:
1. In a television receiver including a source of first and second demodulated quadrature related color mixture signals, apparatus for manually changing the hue determined by said color mixture signals, comprising:
means responsive to user stimulus and said source for generating first and second control signals;
first means coupled to said source of color mixture signals and responsive to said first control signal for generating the product of said first control signal times said first color mixture signal, said product being representative of a modified first color mixture signal;
second means coupled to said source of color mixture signals and responsive to said second control signal for generating the product of said second control signal times said second color mixture signal, said product being representative of a modified second color mixture signal and wherein said first and second control signals are so interrelated that the magnitude of the vector sum corresponding to the color mixture signals from said source equals the magnitude of the vector sum corresponding to the modified color mixture signals.

2. The apparatus set forth in claim 1 wherein the means for generating said first and second control signals comprises:
means coupled to said source of color mixture signals for generating a signal representing the angle corresponding to the arctangent of said first and second color mixture signals;
means responsive to user stimulus and the signal representing said angle for incrementing or decrementing the value representing said angle;
means responsive to the incremented or decremented angle for generating the sine of said angle, said sine corresponding to the first control signal and for generating the cosine of said angle, said cosine corresponding to the second control signal.

3. The apparatus set forth in claim 2 wherein the means for generating the angle between said color mixture signals includes:
means coupled to the source of said color mixture signals for generating a signal corresponding to the quotient of one of said color mixture signals divided by the other of said color mixture signals;
a ROM having an input port for applying address codes and having an output port, said ROM programmed for producing at said output port signals corresponding to the arctangent of the respective address codes applied to said input port; and
means for coupling the signal corresponding to said quotient to the input port of said ROM.

4. The apparatus set forth in claim 2 wherein the means for producing the sine and cosine of the incremented or decremented angle comprises:
a ROM having an input port for applying address codes and having an output port, said ROM programmed to produce the sine and cosine functions of the respective address codes applied to said input port; and
means for coupling the input port of said ROM to the means for incrementing or decrementing the signal representing said angle.

5. The apparatus set forth in claim 2 further including:
first and second squaring circuits respectively coupled to said source for respectively squaring said first and second color mixture signals;
an ADDER coupled to said first and second squaring means for generating a signal corresponding to the sum of said first and second squared color mixture signals; and
means coupled to said ADDER for generating the square root of said sum, said sum thereafter being coupled to said first and second means.

6. The apparatus set forth in claim 1 wherein the means for generating the first and second control signals comprises:
a first number generator responsive to user stimulus for producing at an output port thereof a variable binary number, $\gamma$, corresponding to said first control signal;
a second number generator responsive to said variable binary number $\gamma$ for producing a second binary number equal to $(1-\gamma^2)$;
means coupled to said source of color mixture signals for generating the binary equivalent, E, of the square of the first color mixture signal divided by the square of said second color mixture signal;
multiplying means having a first input port coupled to receive said binary equivalent E and having a second input port coupled to receive the binary number $(1-\gamma^2)$ for producing the product of E times $(1-\gamma^2)$;
means coupled to said multiplying means for generating the binary equivalent of the product of E times $(1-\gamma^2)$ incremented by one; and
means coupled to the means for incrementing the product for producing the binary equivalent of the square root of the binary equivalent of the product of E times $(1-\gamma^2)$ incremented by one, said binary equivalent of the square root corresponding to said second control signal.

7. The apparatus set forth in claim 6 wherein the second number generator comprises a ROM.

8. The apparatus set forth in claim 6 wherein the means for generating the binary equivalent E comprises:
a ROM having an input port for address codes coupled to receive said first color mixture signal and programmed to produce at an output port thereof respective logarithms of the applied address codes squared;
a further ROM having an input port for address codes coupled to receive said second color mixture signal and programmed to produce at an output port thereof respective logarithms of the applied address codes squared;
a binary subtraction circuit having first and second input ports respectively coupled to the output ports of said ROM and said further ROM and having an output port; and
a still further ROM having an input port for address codes coupled to the output port of said ADDER and programmed to produce respective antilogarithms of applied address codes.

9. In a television receiver including a source of first and second demodulated quadrature related color mixture signals, apparatus for manually changing the hue determined by said color mixture signals, apparatus for manually changing the hue determined by said color mixture signals comprising:
means responsive to the color mixture signals for generating a signal corresponding to the angle $\phi$ between the vector sum of the color mixture signals and an axis of one of the color mixture signals;
means responsive to user stimulus for incrementing or decrementing the signal corresponding to said angle;
means responsive to the signals corresponding to said incremented or decremented angles $\phi \pm \Delta\phi$ for generating signals corresponding to the sines and cosines of said angles;
means responsive to the color mixture signals for generating a signal, C, corresponding to the vector sum of the color mixture signals;
a first multiplier responsive to the signal C and the signal corresponding to the sine of $\phi \pm \Delta\phi$ for generating a corrected color mixture signal C sin $(\phi \pm \Delta\phi)$; and
a second multiplier responsive to the signal C and the signal corresponding to the cosine of $\phi \pm \Delta\phi$ for generating a second corrected color mixture signal C cos $(\phi \pm \Delta\phi)$.

10. The apparatus set forth in claim 9 wherein the means for generating a signal corresponding to the angle $\phi$ comprises:
means coupled to the source of said color mixture signals for generating a signal corresponding to the quotient of one of said color mixture signals divided by the other of said color mixture signals;

a ROM having an input port for applying address codes and having an output port, said ROM programmed for producing at said output port signals corresponding to the arctangent of the respective address codes applied to said input port; and means for coupling the signal corresponding to said quotient to the input port of said ROM.

11. The apparatus set forth in claim 9 wherein the means for generating signals corresponding to sin $\phi \pm \Delta\phi$ and cos $(\phi \pm \Delta\phi)$ comprises:

a ROM having an input port for applying address codes and having an output port, said ROM programmed to produce the sine and cosine functions of the respective address codes applied to said input port; and means for coupling the input port of said ROM to the means for incrementing or decrementing the signal representing said angle.

* * * * *